United States Patent
Herrmann

(10) Patent No.: US 6,963,046 B2
(45) Date of Patent: Nov. 8, 2005

(54) PROCESS GAS AND METHOD FOR LASER WELDING

(75) Inventor: Johann Herrmann, Unterschleissheim (DE)

(73) Assignee: Linde Aktiengesellschaft, Wiesbaden (DE)

( * ) Notice: Subject to any disclaimer, the term of this patent is extended or adjusted under 35 U.S.C. 154(b) by 0 days.

(21) Appl. No.: 10/433,096

(22) PCT Filed: Nov. 30, 2001

(86) PCT No.: PCT/EP01/14008

§ 371 (c)(1),
(2), (4) Date: Dec. 23, 2003

(87) PCT Pub. No.: WO02/43918

PCT Pub. Date: Jun. 6, 2002

(65) Prior Publication Data

US 2004/0094522 A1 May 20, 2004

(30) Foreign Application Priority Data

| Nov. 30, 2000 | (DE) | 100 59 528 |
| Nov. 30, 2000 | (DE) | 100 59 529 |
| Dec. 18, 2000 | (DE) | 100 63 165 |
| Dec. 18, 2000 | (DE) | 100 63 166 |

(51) Int. Cl.$^7$ .................... B23K 26/12; B23K 26/20

(52) U.S. Cl. .................... 219/121.63; 252/372

(58) Field of Search .................... 219/121.63, 121.64; 252/372; 372/59

(56) References Cited

U.S. PATENT DOCUMENTS

| 3,939,323 | A | * | 2/1976 | Meehan et al. | 219/121.64 |
| 4,000,392 | A | * | 12/1976 | Banas et al. | 219/121.63 |
| 5,073,897 | A | * | 12/1991 | Larue et al. | 372/59 |
| 5,539,180 | A | * | 7/1996 | Mori et al. | 219/121.64 |
| 5,618,452 | A | * | 4/1997 | Matubara et al. | 219/121.63 |

FOREIGN PATENT DOCUMENTS

JP 58-93592 A * 6/1983 ............ 219/121.64

* cited by examiner

Primary Examiner—Geoffrey S. Evans
(74) Attorney, Agent, or Firm—Crowell & Moring LLP

(57) ABSTRACT

A process gas for use in laser welding with a laser beam focused onto the work piece to be welded. The inventive process gas comprises helium, nitrogen, and at least one of carbon dioxide in an amount of up to 40% by volume, and oxygen in an amount of up to 30% by volume. The gas may comprise not more than 85% by volume of helium. Also disclosed are methods of laser welding using the inventive process gas. The invention is suitable for laser welding of low-alloy steels and coated, especially zinc-coated steels.

25 Claims, No Drawings

PROCESS GAS AND METHOD FOR LASER WELDING

The invention relates to a process gas for laser welding with a laser beam, focused on a workpiece to be welded. Furthermore, the invention relates to a method for laser welding, whereby a focused laser beam is guided to a workpiece surface to be machined, and an inert gas-containing process gas stream is guided against the workpiece surface, where the process gas is applied.

The properties of laser irradiation, in particular the intensity and good focusability, have resulted in the use of lasers today in many areas of material machining. The laser machining systems are well-known. They usually exhibit a laser machining head, optionally with a nozzle, arranged coaxially to the laser beam. Laser machining systems are often used in connection with a computerized numeric control (CNC).

A focused laser beam is understood to mean within the scope of the invention a laser beam, focused essentially on the workpiece surface. Besides the predominantly used method with laser irradiation, focused on the workpiece surface, the invention can also be applied to a rarely used variant with irradiation that is not focused exactly on the workpiece surface.

In many methods of laser material machining, metallic and/or other material is heated to temperatures at which a reaction with the enveloping gases takes place. Therefore, in many cases industrial gases are used in order to carry out material machining processes more effectively, faster and/or with improved quality.

EP 579 205 includes a process gas mixture for laser welding, which contains 5 to 35% oxygen in argon, nitrogen, or helium. In place of oxygen, dry air can also be used. In this respect the dry air content may not fall below 25%.

In laser welding the process gases fulfill various tasks. The control and reduction of the plasma is mandatory at high laser performances. This is known, for example, from the publication "Laser im Nebel", Dr. W. Danzer and Klaus Behler, LASER journal, edition January 1987, pages 32 to 36. Other tasks, like the protection against oxidation, a metallurgical optimization and/or a maximization of the speed and quality (splatter, pores, weld quality), have been ignored to date.

In laser welding it is known to use inert protective gases, like helium or argon. Even nitrogen is used to some degree. Now and then carbon dioxide, oxygen or hydrogen are also mixed in with argon or nitrogen.

Therefore, the invention was based on the problem of providing a process gas and a corresponding method that enables an improved laser welding. In particular, besides the control and reduction of the plasma, protection against oxidation, metallurgical optimization and/or maximization of the speed and the quality are also achieved with the aid of the process gas.

The invention solves this problem in that the process gas contains between 5 and 50% by vol. helium and, besides nitrogen, at least carbon dioxide with a content of 1 to 40% by vol.

It is crucial for the invention that the process gas exhibit, besides an inert gas content, also an active gas content.

Tests have demonstrated that even just a relatively low helium content on the order of magnitude of about 25% by vol. (for example, ±10%) usually suffices for an effective plasma control. The exact percentage for the helium content depends on various factors, such as the laser power, the energy density, the type of material, the quantity of vaporized material, the quantity of protective gas, the type of gas feed to the welding process, etc. Against the background of these influencing factors, the adjustment of the gas composition does not present any problem to the ordinarily skilled in the field.

In an advantageous embodiment of the invention, the process gas contains, besides helium and nitrogen, carbon dioxide with a content of 1 to 40% by vol. and oxygen with a content of up to 30% by vol.

In a further embodiment of the invention, the process gas contains between 1 and 35% by vol. carbon dioxide, preferably between 5 and 30% by vol. carbon dioxide, especially preferred between 10 and 25% by vol. carbon dioxide.

Tests with zinc-coated sheets yielded very good results with a content ranging from 10 to 25% by vol. carbon dioxide (for example, 15% by vol. $CO_2$). The inventive carbon dioxide content resulted in significantly more constant welding results. The welding process was significantly safer and less sensitive to contamination of the weld region. The speed could be noticeably increased.

In a design variant the process gas contains oxygen with a content of more than 10% by vol. oxygen, preferably between 15 and 25% by vol. oxygen. The process gas of this embodiment provides in particular for a significant increase in the welding speed.

In another variant the process gas contains between 0.1 and 20% by vol. oxygen, preferably between 0.5 and 10% by vol. oxygen. In this design variant the aspect of the protection of the workpiece against oxidation is especially distinct.

In particular, process gases
  comprising a ternary gas mixture with the components helium, nitrogen and carbon dioxide,
  comprising a quaternary gas mixture with the components helium, nitrogen carbon dioxide, and oxygen,
  comprising a quaternary gas mixture with the components helium, nitrogen, argon and carbon dioxide, or
  comprising a ternary gas mixture with the components helium, nitrogen, argon, carbon dioxide and oxygen,
have proved useful.

In an embodiment of the invention, in particular of the ternary, quaternary or quinary gas mixtures, process gases, which contain between 5 and 50% by vol. helium, 1 to 40% by vol. carbon dioxide, 0 to 40% by vol. oxygen, 0 to 40% by vol. (in particular 0 to 25% by vol., preferably 0 to 20% by vol., especially preferred 0 to 15% by vol.) argon and the rest nitrogen are suitable for laser welding.

In this respect helium serves to suppress or control the plasma, carbon dioxide assists the fusion and the addition of oxygen can induce several specific positive effects in the welding process and contribute to the increase in quality. Nitrogen as well as argon increase the shielding of the welding zone. Nitrogen and argon also fulfill at least partially the task of the helium and contribute, therefore, as an economical substitute for the inert gas helium, increasing the economic efficiency of laser welding.

The invention can be used in connection with all kinds of lasers. Above all, it is suitable for use in laser machining with Nd:YAG lasers, diode lasers and $CO_2$ lasers.

Low-alloyed steels and coated, in particular zinc-coated steels can be welded especially advantageously with the inventive process gas.

What is claimed is:
1. A process gas for laser welding wherein a laser beam is focused on a workpiece to be welded, the process gas comprising nitrogen, between about 5% and about 50% by volume of helium, and about 1% to about 40% by volume of carbon dioxide.

2. A process gas according to claim 1, wherein the carbon dioxide has a content of between about 1 and 35% by volume.

3. A process gas according to claim 1, wherein the carbon dioxide has a content of between about 5 and 30% by volume.

4. A process gas according to claim 1, wherein the process gas consists of helium, nitrogen and carbon dioxide.

5. A process gas according to claim 1, further comprising argon.

6. A process gas according to claim 5, wherein the process gas consists of helium, nitrogen, carbon dioxide and argon.

7. A process gas according to claim 1, comprising between about 5% and 50% by volume of helium, 1% to 40% by volume of carbon dioxide, 0 to 40% by volume oxygen, 0 to 40% by volume of argon and nitrogen for the balance.

8. A method for laser welding, whereby a focused laser beam is guided to a workpiece surface to be machined and a stream of a process gas according to claim 1 is guided against the workpiece surface.

9. A method according to claim 8, wherein the method is for laser welding of low-alloyed steel.

10. A method according to claim 9, wherein the low-alloyed steel is coated.

11. A method according to claim 10, wherein the low-alloyed steel is zinc-coated.

12. A process gas for laser welding wherein a laser beam is focused on a workpiece to be welded, wherein the process gas consists of helium, nitrogen, about 1% to about 40% by volume of carbon dioxide, and up to about 30% by volume of oxygen.

13. A process gas for laser welding wherein a laser beam is focused on a workpiece to be welded, the process gas comprising nitrogen, helium, about 1% to about 40% by volume of carbon dioxide, and from about 0.1% to 30% by volume of oxygen.

14. A process gas according to claim 13, wherein the oxygen has a content of about 0.1% and about 20% by volume.

15. A process gas according to claim 14, wherein the oxygen content is between about 0.5% and 20% by volume.

16. A process gas according to claim 13, wherein the carbon dioxide has a content of between about 1 and 35% by volume.

17. A process gas according to claim 13, wherein the carbon dioxide has a content of between about 5 and 30% by volume.

18. A method for laser welding, whereby a focused laser beam is guided to a workpiece surface to be machined and a stream of a process gas according to claim 13 is guided against the workpiece surface.

19. A method according to claim 18, wherein the method is for laser welding of low-alloyed steel.

20. A method according to claim 19, wherein the low-alloyed steel is coated.

21. A method according to claim 20, wherein the low-alloyed steel is zinc-coated.

22. A process gas for laser welding wherein a laser beam is focused on a workpiece to be welded, the process gas comprising nitrogen, helium, about 1% to about 40% by volume of carbon dioxide, and at least about 10% by volume of oxygen.

23. A process gas according to claim 22, wherein the oxygen content is between about 15% and 25% by volume.

24. A process gas for laser welding wherein a laser beam is focused on a workpiece to be welded, the process gas comprising nitrogen, helium, about 1% to about 40% by volume of carbon dioxide, up to about 30% by volume of oxygen, and argon.

25. A process gas according to claim 24, wherein the process gas consists of helium, nitrogen, carbon dioxide and argon.

* * * * *